United States Patent
King et al.

(10) Patent No.: US 6,498,453 B1
(45) Date of Patent: Dec. 24, 2002

(54) TWO-PHASE STEPPING MOTOR GAUGE CONTROL SYSTEM

(75) Inventors: Douglas Jay King, Lapeer, MI (US); Ronald Kenneth Selby, Flint, MI (US); Michael John Schnars, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 28 days.

(21) Appl. No.: 09/703,776

(22) Filed: Nov. 1, 2000

(51) Int. Cl.[7] .............................. H02P 1/46; H02P 3/18; H02P 5/28; H02P 7/36

(52) U.S. Cl. ..................................... 318/701; 310/49 R

(58) Field of Search ................................. 318/701, 685, 318/696; 310/49 R

(56) References Cited

U.S. PATENT DOCUMENTS

| | | | | |
|---|---|---|---|---|
| 5,610,492 A | * | 3/1997 | Leung et al. | 318/696 X |
| 5,783,939 A | * | 7/1998 | Lippmann et al. | 318/696 X |
| 5,847,475 A | * | 12/1998 | Rauch et al. | 318/696 X |

* cited by examiner

*Primary Examiner*—Jeffrey Donels
(74) *Attorney, Agent, or Firm*—Stefan V. Chmielewski

(57) ABSTRACT

A method for controlling a two-phase stepping motor gauge for an instrument cluster includes the steps of: providing a two-phase motor for displaying information to a driver, determining a desired position of the two phase motor at a rate and in a manner consistent with an intended application; updating a waveform to the input of a first inverter coupled to one of the motor coils; integrating the waveform using a first and second inverter to energize one of the motor coils. Thus, the present invention allows the control of a conventional two-phase motor coil using only one control signal. Additionally, the present invention requires low actual current to maintain gauge position.

21 Claims, 1 Drawing Sheet

TWO-PHASE STEPPING MOTOR GAUGE CONTROL SYSTEM

TECHNICAL FIELD

The present invention relates generally to control systems for stepper motors, and more particularly, to a two-phase stepping motor gauge control system.

BACKGROUND ART

Analog instrumentation remains the most widely used and preferred method of displaying automobile data to the driver. This is due to their simple function and ability to be adapted to many different styles. Even expensive automobile models that essentially have an unlimited instrumentation budget commonly choose analog gauges. Future requirements for instruments will unquestionably include analog gauges.

Although air core gauges have enjoyed wide usage for many, many years, they continue to enjoy significant usage in the age of electronics because they provide certain advantages that newer electronic readouts have not yet been able to achieve. Perhaps, most significant of these advantages are cost, durability, and ease of reading.

An air core gauge can be fabricated in a cost-effective manner. Once an air core gauge has been installed and found to be operating properly, it should provide reliable service for the life of the vehicle in normal circumstances. Because an air core gauge uses a pointer to indicate its reading, the driver can quickly see if a reading is normal or abnormal.

An electronic gauge that comprises a digital readout is generally more costly, and the value of the parameter which it displays may require interpretation by the driver in order to determine if the reading is normal or abnormal. While the latter attribute of a digital electronic readout may not always be true in the case of a digital speedometer, a digital tachometer, or a digital fuel level gauge, it is often true in the case of other readouts.

Stepper motor gauges are being used increasingly in vehicle displays instead of traditional air core gauges because they exhibit improved accuracy, linearity, lower power consumption and they are easier to drive from a microprocessor. Unfortunately, typical control of a two-phase stepper motor coil requires the use of two control lines.

In some stepper motors, the geometry of the motor core provides two natural stable or detent points for the two pole rotor. Adjacent points define a full motor step. These points are important when considering the behavior of the motor when a gauge is powered down. When power is removed from the motor, the rotor approaches equilibrium to the closest one of the two detent points and is used as a rest point. Other stepper motors are designed to minimize the stable detent effect, and when power is removed from the motor the rotor remains stationary due to friction. In this case, any point may be selected as a rest point.

The disadvantages associated with these conventional motor control techniques have made it apparent that a new technique for two-phase stepper motor control is needed. The new technique should allow the control of a conventional two-phase motor coil using only one control signal. Additionally, the new technique should require low actual current to maintain gauge position. The present invention is directed to these ends.

SUMMARY OF THE INVENTION

It is, therefore, an object of the invention to provide an improved and reliable two-phase stepping motor gauge control system. Another object of the invention is to allow the control of a conventional two-phase motor coil using only one control signal.

In accordance with the objects of this invention, a two-phase stepping motor gauge control system is provided. In one embodiment of the invention, a method for controlling a two-phase stepping motor gauge for an instrument cluster includes the steps of: providing a two-phase motor for displaying information to a driver, determining a desired position of the two phase motor at a rate and in a manner consistent with an intended application; updating a waveform to the input of a first inverter coupled to one of the motor coils; integrating the waveform using a first and second inverter to energize one of the motor coils.

The present invention thus achieves an improved two-phase stepping motor gauge control system. The present invention is advantageous in that low actual current is required to maintain gauge position.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
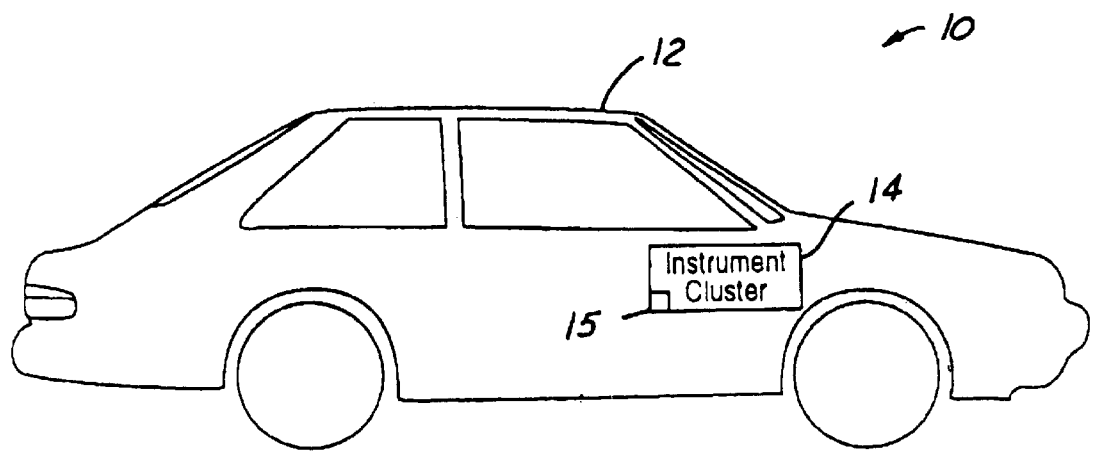
FIG. 1 depicts a two-phase stepping motor gauge control system in accordance with one embodiment of the present invention.

In the following figures, the same reference numerals will be used to identify identical components in the various views. The present invention is illustrated with respect to a two-phase stepping motor gauge control system, particularly suited for the automotive field. However, the present invention is applicable to various other uses that may require two-phase stepping motor gauge control systems.

Referring to FIG. 1, a two-phase stepping motor gauge control system 10 in accordance with one embodiment of the present invention is illustrated. Two-phase stepping motor gauge control system 10 includes a vehicle 12 having and instrument cluster 14. Instrument cluster 14 includes one or more gauges controlled by a two-phase stepping motor gauge control circuit 15.

Analog instrumentation remains the most widely used and preferred method of displaying automobile data to the driver. This is due to their simple function and ability to be adapted to many different styles. Even expensive automobile models that essentially have an unlimited instrumentation budget commonly choose analog gauges. Future requirements for instruments will unquestionably include analog gauges.

Although air core gauges have enjoyed wide usage for many, many years, they continue to enjoy significant usage in the age of electronics because they provide certain advantages that newer electronic readouts have not yet been able to achieve. Perhaps, most significant of these advantages are cost, durability, and ease of reading.

Stepper motor gauges are being used increasingly in vehicle displays instead of traditional air core gauges because they exhibit improved accuracy, linearity, lower power consumption and they are easier to drive from a microprocessor.

Figure 2:
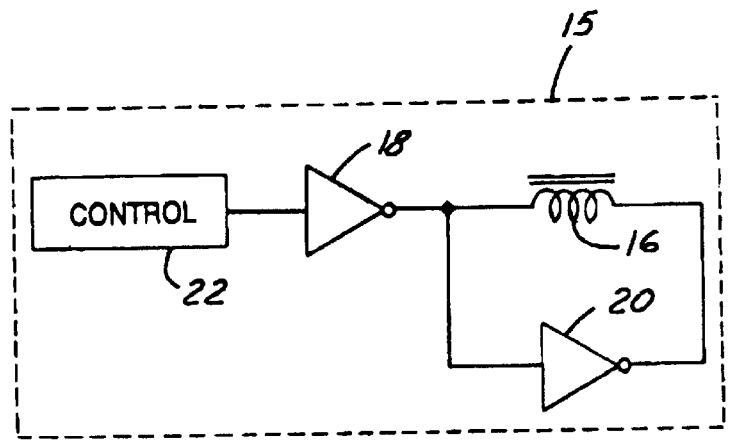
FIG. 2 is a block diagram of a two-phase stepping motor gauge control circuit in accordance with one embodiment of the present invention.

Referring to FIG. 2, a block diagram of a two-phase stepping motor gauge control circuit 15 in accordance with one embodiment of the present invention is illustrated. Circuit 15 includes a two-phase stepper motor 16 coupled in series with a first inverter 18 and in parallel with second inverter 20. A controller 22 is coupled to the input of first inverter 18. The output of first inverter 18 is coupled to a first side of stepper motor 16 and the input of second inverter 20. The output of second inverter 20 is coupled to a second side of stepper motor 16.

While circuit 15 appears to provide only one level bi-directional current, it is possible to use a property of electro-mechanical systems with inertia to effectively integrate any applied waveform over a wide range of cycles. The average magnetic field in one coil of a two-phase stepping motor can be controlled by rapidly alternating the direction of a (nominally) constant voltage across the coil. Controlling the relative amounts of time spent with the voltage in each direction controls the average magnitude of the electrical field, allowing micro-stepping of motor 16.

Controller 22 includes control logic operative to adjust the position of motor 16 to display information to the driver. Controller 22 begins by determining the desired position of motor 16. The desired position is determined at a rate (typically one to two milliseconds) and in a manner consistent with the intended application, to achieve desired smoothness and velocity, and within acceleration constraints. The controller 22 then updates the modulation level to the input of first inverter 18. The modulation level may be obtained from tables indexed by the desired motor postion. The contents of the table are chosen such that the motor position step size is the same through an entire 360-degree rotation.

In one embodiment of the present invention, controller 22 includes hardware capable of generating a pulse width modulation level for first inverter 18. In an alternative embodiment of the present invention, controller 22 includes software capable of generating a pulse frequency modulation level for first inverter 18. One skilled in the art would realized that there are many ways to implement pulse width and pulse frequency modulation, and that the methods provided here are merely for illustrative purposes.

The present invention thus achieves an improved and reliable two-phase stepping motor gauge control system by using a pulse width modulation signal on a single control line. In this way, the present invention allows the control of a conventional two-phase motor coil using only one control signal. Additionally, the present invention requires low actual current to maintain gauge position.

From the foregoing, it can be seen that there has been brought to the art a new and improved two-phase stepping motor gauge control system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A method for controlling an instrument gauge comprising the steps of:
   providing a two-phase motor for displaying information to a driver, said two-phase motor having a first coil and a second coil;
   determining a desired position of said two-phase motor at a rate and in a manner consist with an intended application;
   updating a waveform, having a modulation level, to the input of a first inverter coupled to said first coil; and
   integrating said waveform using said first inverter and a second inverter to energize said first coil, whereby said two-phase motor achieves said desired position.

2. A method for controlling an instrument gauge comprising the steps of:
   providing a two-phase motor for displaying information to a driver, said
   two-phase motor having a first coil and a second coil;
   determining a desired position of said two-phase motor at a rate and in a manner consistent with an intended application;
   updating a pulse width modulation waveform, having a modulation level, to the input of a first inverter coupled to said first coil; and
   integrating said waveform using said first inverter and a second inverter to energize said first coil, whereby said two-phase motor achieves said desired position a pulse width modulation waveform.

3. The method for controlling an instrument gauge as recited in claim 2, wherein said pulse width modulation waveform is generated using hardware.

4. The method for controlling an instrument gauge as recited in claim 2, wherein said pulse width modulation waveform is generated using software.

5. The method for controlling an instrument gauge as recited in claim 1, wherein said waveform is a pulse frequency modulation waveform.

6. The method for controlling an instrument gauge as recited in claim 5, wherein said pulse frequency modulation waveform is generated using hardware.

7. The method for controlling an instrument gauge as recited in claim 5, wherein said pulse frequency modulation waveform is generated using hardware.

8. The method for controlling an instrument gauge as recited in claim 1, wherein said modulation level is obtained from a table indexed by said desired position.

9. The method for controlling an instrument gauge as recited in claim 1, further comprising the step of updating a waveform, having a modulation level, to the input of a third inverter coupled to said second coil.

10. The method for controlling an instrument gauge as recited in claim 1, further comprising the step of integrating said waveform using a third and forth inverter to energize said second coil, whereby said two-phase motor achieves said desired position.

11. A two-phase stepping motor gauge control apparatus comprising:
   a two-phase motor for displaying information to a driver, said two-phase motor having a first coil and a second coil;
   a first inverter having a first inverter input and a first inverter output, said first inverter output coupled to said first coil;
   a second inverter having a second inverter input and a second inverter output, said second inverter input coupled to said first inverter output, said second inverter output coupled to said first coil;

a controller coupled to said first inverter input, said controller including control logic operative to determine a desired position of said two-phase motor at a rate and in a manner consistent with an intended application, update a waveform, having a modulation level, to said first input; and wherein said waveform is integrated using said first and second inverter to energize said first coil, whereby said two-phase motor achieves said desired position.

12. A two-phase stepping motor gauge control apparatus comprising:

a two-phase motor for displaying information to a driver, said two-phase motor having a first coil and a second coil;

a first inverter having a first inverter input and a first inverter output, said first inverter output coupled to said first coil;

a second inverter having a second inverter input and a second inverter output, said second inverter input coupled to said first inverter output, said second inverter output coupled to said first coil;

a controller coupled to said first inverter input, said controller including control logic operative to determine a desired position of said two-phase motor at a rate and in a manner content with an intended application, update a pulse width modulation waveform, having a modulation level, to said first input; and wherein said waveform is integrated using said first and second inverter to energize said first coil, whereby said two-phase motor achieves said desired position.

13. The two-phase stepping motor gauge control apparatus as recited in claim 12, wherein said pulse width modulation waveform is generated using hardware.

14. The two-phase stepping motor gauge control apparatus as recited in claim 12, wherein said pulse width modulation waveform is generated using software.

15. The two-phase stepping motor gauge control apparatus as recited in claim 11, wherein said waveform is a pulse frequency modulation waveform.

16. The two-phase stepping motor gauge control apparatus as recited in claim 15, wherein said pulse frequency modulation waveform is generated using hardware.

17. The two-phase stepping motor gauge control apparatus as recited in claim 15, wherein said pulse frequency modulation waveform is generated using software.

18. The two-phase stepping motor gauge control apparatus as recited in claim 11, wherein said modulation level is obtained from a table located in said controller, said table indexed by said desired position.

19. The two-phase stepping motor gauge control apparatus as recited in claim 11, further comprising:

a third inverter having a third inverter input and a third inverter output, said third inverter output coupled to said second coil;

a forth inverter having a forth inverter input and a forth inverter output, said forth inverter input coupled to said third inverter output, said forth inverter output coupled to said second coil;

a controller coupled to said third inverter input, said controller including control logic operative to determine a desired position of said two-phase motor at a rate and in a manner consistent with an intended application, update a waveform, having a modulation level, to said third input; and wherein said waveform is integrated using said third and forth inverters to energize said second coil, whereby said two-phase motor achieves said desired position.

20. The method for controlling an instrument gauge as recited in claim 2, wherein said modulation level is obtained from a table indexed by said desired position.

21. The two-phase stepping motor gauge control apparatus as recited in claim 12, wherein said modulation level is obtained from a table located in said controller, said table indexed by said desired position.

* * * * *